United States Patent
Wang et al.

(10) Patent No.: US 10,231,564 B2
(45) Date of Patent: Mar. 19, 2019

(54) SCREW EXTRUSION JUICER

(71) Applicant: JOYOUNG COMPANY LIMITED, Jinan (CN)

(72) Inventors: Xuning Wang, Jinan (CN); Yuyin Zhang, Jinan (CN); Guofeng Zhao, Jinan (CN); Bin Duan, Jinan (CN)

(73) Assignee: JOYOUNG COMPANY LIMITED, Jinan (CN)

( * ) Notice: Subject to any disclaimer, the term of this patent is extended or adjusted under 35 U.S.C. 154(b) by 0 days.

(21) Appl. No.: 15/533,995

(22) PCT Filed: Dec. 10, 2015

(86) PCT No.: PCT/CN2015/096950
§ 371 (c)(1),
(2) Date: Jun. 7, 2017

(87) PCT Pub. No.: WO2016/091182
PCT Pub. Date: Jun. 16, 2016

(65) Prior Publication Data
US 2018/0235394 A1    Aug. 23, 2018

(30) Foreign Application Priority Data

Dec. 12, 2014 (CN) .......................... 2014 1 0765022
Nov. 27, 2015 (CN) .......................... 2015 2 0970184

(51) Int. Cl.
*A23N 1/00* (2006.01)
*A47J 19/02* (2006.01)
(Continued)

(52) U.S. Cl.
CPC ................ *A47J 19/02* (2013.01); *A23N 1/02* (2013.01); *A47J 19/00* (2013.01); *A47J 19/025* (2013.01); *A47J 19/06* (2013.01)

(58) Field of Classification Search
CPC .......... A47J 19/02; A47J 19/06; A47J 19/025; A23N 1/02; A23N 1/00
(Continued)

(56) References Cited

U.S. PATENT DOCUMENTS

| | | |
|---|---|---|
| 2008/0164331 A1 | 7/2008 | Schmitt |
| 2012/0266762 A1 | 10/2012 | Wang et al. |
| 2014/0196614 A1 | 7/2014 | Kim |

FOREIGN PATENT DOCUMENTS

| | | |
|---|---|---|
| CN | 101697857 A | 4/2010 |
| CN | 202760966 U | 3/2013 |

(Continued)

OTHER PUBLICATIONS

International Search Report (English and Chinese) and Written Opinion (Chinese) of PCT/CN2015/096950.
(Continued)

*Primary Examiner* — Reginald Alexander
(74) *Attorney, Agent, or Firm* — Kilpatrick Townsend & Stockton LLP

(57) ABSTRACT

A screw-rod squeeze juicer includes a base having a motor, a crushing chamber mounted on the base, and a screw rod arranged inside the crushing chamber. The crushing chamber includes a crushing chamber body, the crushing chamber body has a juice outlet and a residue outlet, the crushing chamber has a feeding opening and a feeding channel connected to the feeding opening, the feeding channel includes an upper opening and a lower opening connected to the feeding opening. A rotatable overturn storage container is provided at the upper opening, a rotation center of the overturn storage container traverses the upper opening, and the overturn storage container is configured for placing a material and is rotatable about the rotation center in any direction.

9 Claims, 9 Drawing Sheets

(51) Int. Cl.
*A23N 1/02* (2006.01)
*A47J 19/00* (2006.01)
*A47J 19/06* (2006.01)

(58) Field of Classification Search
USPC .......................................... 99/510, 511, 513
See application file for complete search history.

(56) References Cited

FOREIGN PATENT DOCUMENTS

| | | | |
|---|---|---|---|
| CN | 203897983 U | 10/2014 | |
| CN | 204394155 U | 6/2015 | |
| CN | 104957958 A | 10/2015 | |
| EP | 2494893 A1 | 9/2012 | |
| EP | 3187076 A1 | 5/2017 | |
| JP | 2004016694 A | 1/2004 | |
| JP | 2006094882 A | 4/2006 | |
| KR | 20120132677 A | 12/2012 | |
| KR | 101300464 B1 | 8/2013 | |
| WO | 2015009015 A1 | 1/2015 | |

OTHER PUBLICATIONS

The first Office Action of Chinese patent Application No. 201410765022.7.
The second Office Action of Chinese patent Application No. 201410765022.7.
Notice to grant of Chinese patent Application No. 201410765022.7.
The grant of Chinese patent Application No. 201410765022.7.
European search report dated Oct. 30, 2017 in a European counterpart Application (Application No. 15866832.7).
Korean Office Action dated Sep. 14, 2017 in a Korean counterpart Application (Application No. 20-2017-7000053).

SCREW EXTRUSION JUICER

This application is the national phase of International Application No. PCT/CN2015/096950, titled "SCREW EXTRUSION JUICER", filed on Dec. 10, 2015, which claims the benefit of priorities to Chinese Patent Application No. 201410765022.7 titled "SAFE AND CONVENIENT SCREW-ROD SQUEEZE JUICER", filed with the Chinese State Intellectual Property Office on Dec. 12, 2014 and Chinese Patent Application No. 201520970184.4 titled "SAFE SCREW-ROD SQUEEZE JUICER", filed with the Chinese State Intellectual Property Office on Nov. 27, 2015, the entire disclosures of which are incorporated herein by reference.

FIELD

The present application relates to the field of food processing machines, and particularly to a juicer.

BACKGROUND

Conventional large-opening juicers are generally provided with a safety cover and a safety switch at an upper end of a feeding opening in order to ensure safety in working. When the safety cover is opened, the safety switch is triggered to turn off the power, and the juicer stops working. When the safety cover is closed, the safety switch is triggered to turn on the power, and at this time, the juicer begins to work. When a user continuously feeds fruit and vegetable materials for juicing, the user needs to open and close the safety cover frequently, which is inconvenient for the user, and adversely affects the user experience, and may also inevitably cause the juicer to start and stop working frequently. Accordingly, high reliability requirements are imposed on the safety switch and the electric control system of the machine, and costs will be increased significantly, moreover, frequent starting and stopping may exacerbate wear of the machine, and shorten the service life of the machine.

SUMMARY

An object of the present application is to provide a safe and convenient screw-rod squeeze juicer.

In view of the above technical issues, a safe and convenient screw-rod squeeze juicer is provided according to the present application, which includes a base having a motor, a crushing chamber mounted on the base, and a screw rod arranged inside the crushing chamber. The crushing chamber includes a crushing chamber body, the crushing chamber body has a juice outlet and a residue outlet, the crushing chamber has a feeding opening and a feeding channel connected to the feeding opening, the feeding channel includes an upper opening and a lower opening connected to the feeding opening. A rotatable overturn storage container is provided at the upper opening, a rotation center of the overturn storage container traverses the upper opening, and the overturn storage container is configured for placing a material and is rotatable about the rotation center in any direction.

Preferably, a rotation center line of the overturn storage container passes through a center of the upper opening.

Preferably, the upper opening has an effective diameter of D1, the overturn storage container has a rotation radius of R, and R<D1/2; the overturn storage container is configured to rotate by at least 60 degrees, to allow the material to enter the feeding channel, and the overturn storage container has a material receiving chamber.

Preferably, the material receiving chamber is in the shape of a bowl, the material receiving chamber has a depth of H, and H<R, and the material receiving chamber has an overturning angle ranging from 90 degrees to 180 degrees, inclusive.

Preferably, the overturn storage container includes a first storage container and a second storage container, the first storage container and the second storage container cooperate with each other to form the material receiving chamber, and the first storage container and the second storage container are configured to be separated from each other to allow the material in the material receiving chamber to fall into the feeding channel; or;

the overturn storage container includes a first material holding plate and a second material holding plate, the first material holding plate and the second material holding plate are arranged to intersect with each other to form the material receiving chamber, the first material holding plate has a length of L1, and L1<R, the second material holding plate has a length of L2, and L2<R, and the material receiving chamber has an L-shaped or V-shaped longitudinal section.

Preferably, a bottom of the overturn storage container has an auxiliary feeding opening, and the auxiliary feeding opening has an equivalent inner diameter of D2, and D2≤45 mm.

Preferably, the overturn storage container is provided with a blocking portion.

Preferably, the overturn storage container includes a material receiving chamber and the blocking portion is arranged on an edge of the material receiving chamber.

Preferably, the material receiving chamber includes an opening located at an upper end, and the blocking portion is a baffle formed by an edge of the opening extending upwards.

Preferably, the baffle extends outwards and forms an inclination angle with respect to the opening, and the inclination angle α>90 degrees; or, two baffles are provided and are symmetrically arranged at opposite two sides with respect to the rotation center of the overturn storage container, the two baffles are spaced from each other by a distance of A, and 45 mm≤A≤90 mm; or, one side of the upper opening of the feeding channel extends outwards to form an extension chamber, and the baffle is accommodated inside the extension chamber while being overturned; or, a height of the baffle is gradually reduced from the middle to two ends, and the baffle is rested on the edge of the upper opening of the feeding channel after being overturned; or, the baffle is formed by the edge of the opening extending upwards first and then being fanged outwards; or, the baffle is formed by the edge of the opening extending outwards first and then extending upwards.

In the present application, the "effective diameter" of the upper opening refers to a dimension which enables the overturn storage container to overturn inside the upper opening. If the upper opening is circular, the equivalent diameter is a diameter of the upper opening; and if the upper opening is elliptic, polygonal or has other irregular shapes, the effective diameter is the diameter of the inscribed circle of the upper opening. The "effective inner diameter" refers to the diameter of the maximum inscribed circle of a horizontal projection of the auxiliary feeding opening.

The beneficial effects of the present application are as follows.

1. The rotatable overturn storage container is provided at the upper opening, the rotation center of the overturn storage container traverses the upper opening, and the overturn storage container is configured for placing a material and can rotate about the rotation center in any direction. Thus, when juicing materials having a large cross section such as an apple, an orange or a tomato, the fruit or vegetable is not required to be cut into pieces, and can be directly placed on the overturn storage container, in this case, the overturn storage container shields the upper opening, to ensure that the hand of a human cannot extend into the feeding channel. Then the overturn storage container is turned about the rotation center, and the material falls into the feeding channel. During rotation, the overturn storage container always covers the upper opening, to ensure that the hand of human cannot extend into the feeding channel. Then the overturn storage container is turned to the initial position, and the material is placed again, and then the overturn storage container is turned to allow the material to enter the feeding channel, and the above operations are repeated. In this way, not only continuous juicing can be achieved, but also operational safety is ensured, and the user is prevented from being injured inadvertently. Further, it is not required to pre-process the fruit and vegetable, thus achieving a continuous whole fruit juicing, and facilitating the user's use, and improving the convenience for the user. Furthermore, the machine does not need to be started and stopped frequently, thus reducing wear of the machine, and improving the service life of the machine.

2. The rotation center of the overturn storage container passes through the center of the upper opening. The rotation center of the overturn storage center passing through the center of the upper opening enables the overturn storage container to have a small rotation range, thus effectively saving the space of the upper opening, and allowing the upper opening to receive the material to a maximum degree, that is, the material having the same size as the diameter of the upper opening can be placed in the feeding channel, thus, the space of the upper opening can be effectively utilized without wasting the space. Moreover, it is not required to enlarge the upper opening in order to place a larger material, which may further enlarge the feeding channel and adversely affect the esthetic accordingly.

3. The effective diameter of the upper opening is D1, the rotation radius of the overturn storage container is R, and R<D1/2. The overturn storage container has a material receiving chamber. When the opening of the material receiving chamber faces upward, the material is located at the upper opening, and when the opening of the material receiving chamber faces downwards, the material falls into the feeding channel. The feeding channel has a simple structure, can be easily molded and manufactured, has a reduced manufacturing cost, and has a smooth internal structure, thus has a low resistance and can facilitate material feeding. Moreover, R<D1/2, thus ensuring that the overturn storage container will not interfere with the side wall of the feeding channel when the overturn storage container rotates. Furthermore, this arrangement facilitates placing a circular material or an approximately circular material, and ensures that the material will not slide off from the overturn storage container, and further increases a placing space for the material, and can accommodate a larger material.

4. The material receiving chamber is in the shape of a bowl, which increases the space of the overturn storage container, that is, the overturn storage container can accommodate a larger material. Further, H<R, which ensures that the overturn storage container will not interfere with the side wall of the feeding channel in rotation.

5. The overturn storage container is configured to be formed by combining the first storage container and the second storage container, and in a normal condition, the first storage container and the second storage container cooperate with each other to form the material receiving chamber. When feeding a material, the first storage container and the second storage container are rotated to be separated from each other, that is, the material receiving chamber is opened, and the material falls into the feeding channel, thus finishing the material feeding. This reduces the overturning angle of the overturn storage container, that is, even if the overturn storage container rotates by a small angle, the material receiving chamber can be separated, to allow the material to fall into the feeding channel, thus facilitating the user's operation, and improving the user experience.

6. The overturn storage container includes a first material holding plate and a second material holding plate, such that the overturn storage container has a simple structure, and the manufacturing and molding of the overturn storage container is facilitated, and the manufacturing cost is reduced. Further, L1<R, and L2<R, which ensures that the overturn storage container will not interfere with the side wall of the feeding channel in rotation.

7. The auxiliary feeding opening is provided at the bottom of the overturn storage container, thus, when it is required to feed strip-shaped fruits or vegetables, for example, carrot, celery, the material can be fed from the auxiliary feeding opening, to facilitate the user's operation and improve the user experience. In addition, the equivalent inner diameter D2 of the auxiliary feeding opening meets the condition of $D2 \leq 45$ mm, which ensures that a user's hand cannot extend into the feeding channel from the auxiliary feeding opening, thus ensuring the operational safety, maximizing the auxiliary feeding opening, and facilitating feeding material for the user.

8. The blocking portion is provided, thus, the overturn storage container 4 can always block a human body during the overturning process no matter which overturning angle the overturn storage container is located at, to prevent the hand of the human body from extending into the feeding channel and further contacting the screw rod and being injured accordingly, and avoid a safety loophole of the overturn storage container caused by the overturning angle, to thereby achieving comprehensive safety protection to a human body, to allow users to use the juicer trustingly. In addition, by providing the blocking portion, it is convenient for the user to hold the blocking portion, such that, the user can overturn the storage container just by holding the blocking portion, thus facilitating the operation.

9. By arranging the blocking portion at the edge of the material receiving chamber, the blocking portion can only block a human body during the overturning process and does not interfere with the feeding of materials, thereby ensuring the safety of the human body and preventing the hand from being stuck without interfering with the feeding of the material into the feeding channel, to allow the material to participate in the squeezing and juicing process, such that the overturning process can be performed smoothly, and the material can be fed smoothly without any hindrance.

DETAILED DESCRIPTION

Figure 1:
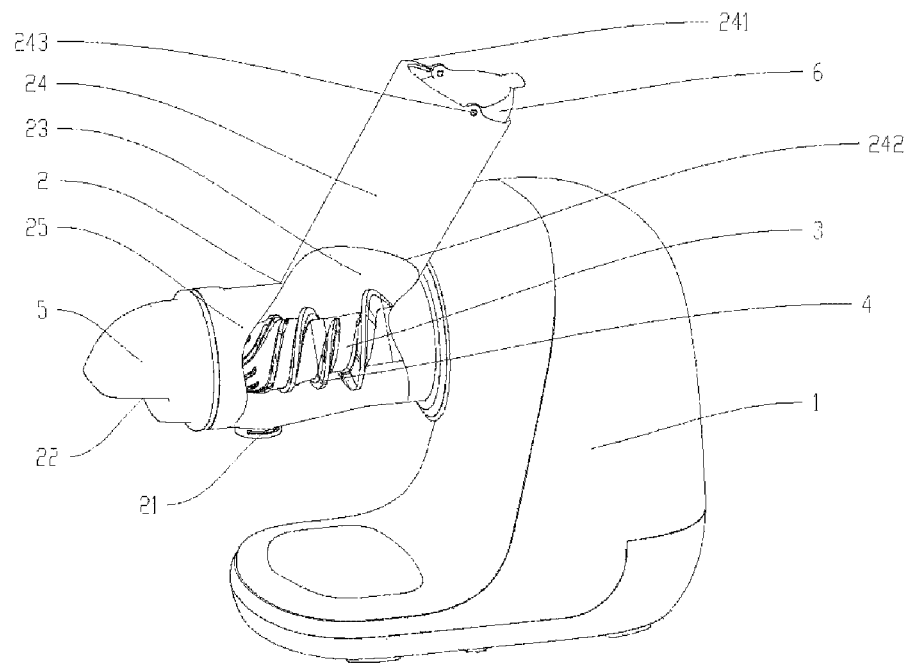
FIG. 1 is a schematic view showing the structure of a first embodiment of a juicer according to the present application.
Figure 2:
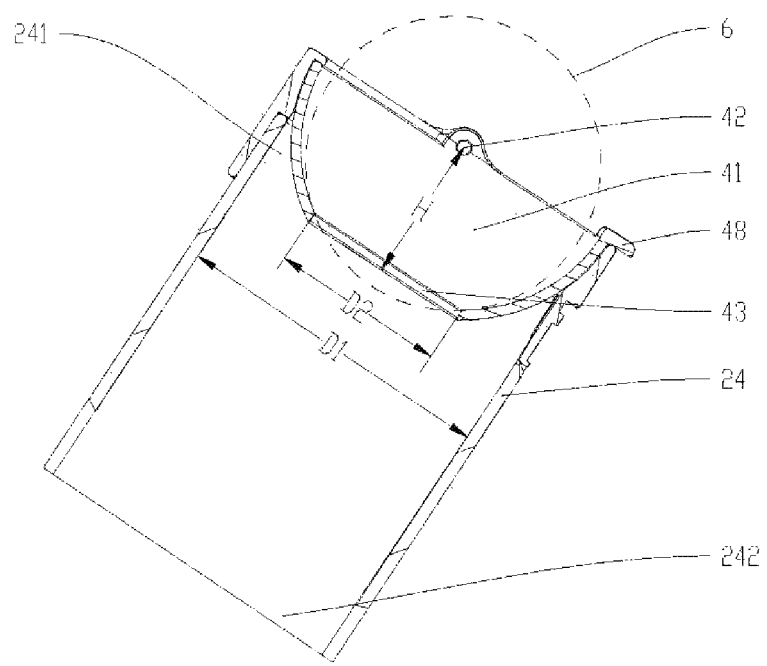
FIG. 2 is a schematic view showing an initial state of an overturn storage container in a first embodiment of the juicer according to the present application.
Figure 3:
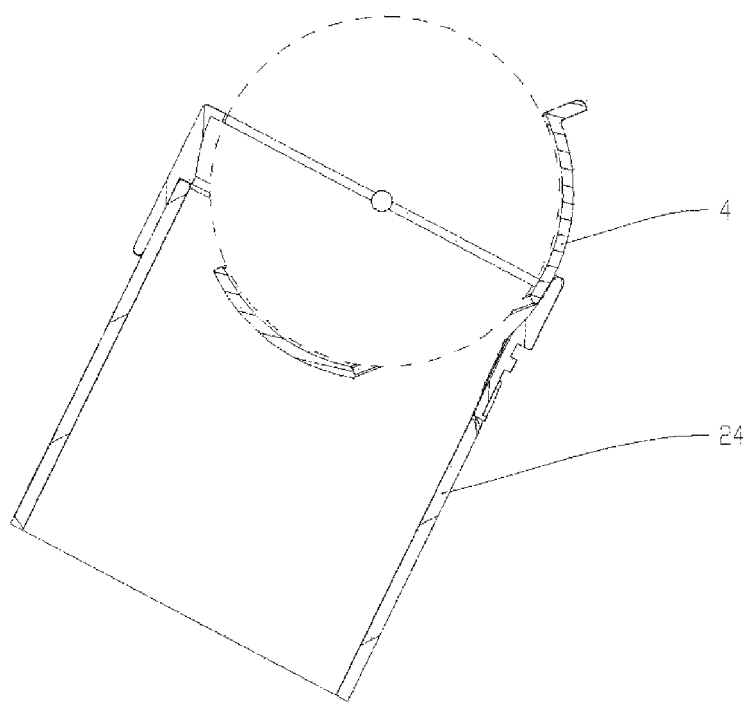
FIG. 3 is a schematic view showing an overturning process of the overturn storage container in the first embodiment of the juicer according to the present application.
Figure 4:
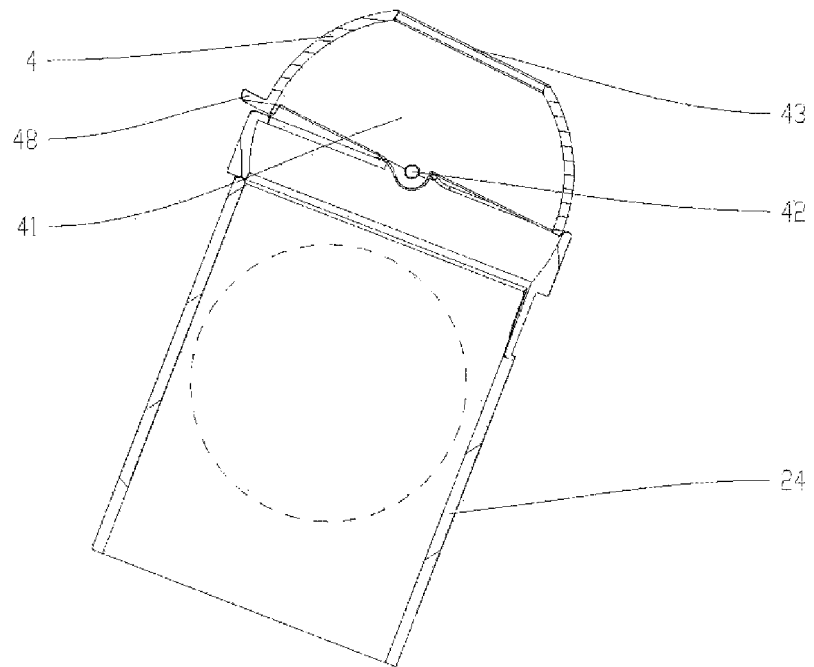
FIG. 4 is a schematic view showing a final state of the overturn storage container in the first embodiment of the juicer according to the present application.

The present application is further described in detail hereinafter in conjunction with the drawings and embodiments.

First Embodiment

As shown in FIGS. 1 to 4, a safe and convenient screw-rod squeeze juicer according to the present application is embodied as a horizontal squeeze juicer in this embodiment, and includes a base 1 having a motor, a crushing chamber 2 mounted at one side of the base 1, and a squeezing screw rod 3 horizontally arranged inside the crushing chamber 2. An outer surface of the squeezing screw rod 3 is provided with a squeezing spiral, and an inner surface of the crushing chamber 2 is provided with a squeezing rib configured to cooperate with the squeezing spiral to squeeze and crush the material. Multiple squeezing ribs are provided and are integrally formed with the crushing chamber 2. The crushing chamber 2 includes a crushing chamber body 25 and an end cover 5 arranged on an end of the crushing chamber body 25. The end cover 5 is connected to the crushing chamber body 25 by screw coupling. The crushing chamber body 25 is provided with a juice outlet 21, a residue outlet 22, a feeding opening 23 and a feeding channel 24 connected to the feeding opening 23. The feeding opening 23 is arranged in a side wall of the crushing chamber body 25, the feeding channel 24 includes an upper opening 241 and a lower opening 242 connected to the feeding opening 23. The feeding channel 24 is a straight circular tube. The upper opening 241 has an effective diameter of D1, and an overturn storage container has a rotation radius of R, and R<D1/2. Such arrangement has the following advantages, the feeding channel has a simple structure and is easy to be formed and manufactured, thus has a reduced manufacturing cost, and the feeding channel has a smooth internal structure and has a low resistance, which facilitates feeding the material. Further, since R<D1/2, it ensures that the overturn storage container will not interfere with a side wall of the feeding channel when the overturn storage container is rotating.

A rotatable overturn storage container 4 is movably arranged at the upper opening 241. The rotation center of the overturn storage container 4 traverses the upper opening 241. The overturn storage container 4 is configured for placing a material 6, and can rotate about the rotation center in any direction. The overturn storage container 4 is configured to rotate by at least 60 degrees, to allow the material 6 to enter the feeding channel 24. The overturn storage container rotates by at least 60 degrees, which ensures that the material can fall into the feeding channel, thereby accomplishing the juicing process.

The overturn storage container 4 is provided with an operating portion 48 configured to facilitate the overturning. The operating portion 48 is embodied as a projection, and the projection is integrally formed with the overturn storage container 4. The rotation center of the overturn storage container 4 passes through the center of the upper opening 241. Such arrangement has the following advantages, by providing the operating portion, it is convenient to turn the overturn storage container, facilitates a user's operation, and improves humanization of the product.

The overturn storage container 4 has a material receiving chamber 41, and when an opening of the material receiving chamber 41 faces upwards, the material 6 is located at the upper opening 241, and when the opening of the material receiving chamber 41 faces downwards, the material 6 falls into the feeding channel 24.

The overturn storage container 4 is in the shape of a hemisphere, and the material receiving chamber 41 is in the shape of a bowl. The material receiving chamber 41 has a depth of H, and H<R. An overturning angle of the material receiving chamber ranges from 90 degrees to 180 degrees, inclusive. The overturning angle of the material receiving chamber is set to ensure that the material can completely enter the feeding channel without being stuck. The overturning angle of the material receiving chamber in this embodiment is 180 degrees.

The bottom of the overturn storage container 4 has an auxiliary feeding opening 43. The auxiliary feeding opening 43 is circular and has an equivalent inner diameter of D2, and D2≤45 mm. Such arrangement has the following advantages, when it is required to feed strip-shaped fruits or vegetables, for example, carrot, celery, the material can be fed from the auxiliary feeding opening, to facilitate the user's operation, and improve the user experience. In addition, since the equivalent inner diameter D2 of the auxiliary feeding opening meets the condition of D2≤45 mm, it can be ensured that the user's hand cannot extend into the feeding channel from the auxiliary feeding opening, to ensure the operational safety, and also maximizing the auxiliary feeding opening, to facilitate feeding materials for the user.

The side wall of the feeding channel 24 has a rotation hole 243, and a side wall of the overturn storage container 4 is provided with a rotation shaft 42. The overturn storage container 4 is articulated to the side wall of the feeding channel 24 by the cooperation between the rotation shaft 42 and the rotation hole 243, and the overturn storage container 4 can rotate by at least 90 degrees about the rotation shaft 42. Such arrangement has the following advantages, the rotation of the overturn storage container is achieved by the cooperation between the rotation shaft and the rotation hole, this structure is simple and can be easily implemented. Moreover, the overturn storage container can rotate about the rotation shaft by at least 90 degrees, thus ensuring that the material can fall into the feeding channel when the overturn storage container is turned.

The working manner of the overturn storage container is described as follows.

First, the material 6 is placed in the material receiving chamber 41, and the operating portion 48 is flipped to rotate the overturn storage container 4 about the rotation shaft 42. When the overturn storage container 4 rotates to a certain angle, the material falls into the feeding channel; and when it is required to feed a material again, the overturn storage container 4 is rotated back to the initial position, and then the material is placed into the material receiving chamber 41, and the above operations are repeated.

It may be appreciated that, the feeding channel is a quadrangular tube; apparently, it may also be other polygonal tubes, such as a triangular tube, a pentagonal tube. The feeding channel can be a bent circular tube, a straight elliptical tube, a bent elliptical tube, a straight conical tube, or a bent conical tube.

It may be appreciated that, the rotation center of the overturn storage container is offset from the center of the upper opening.

It may be appreciated that, the operating portion is a crank, the crank passes through the rotation center of the overturn storage container, to drive the overturn storage container to rotate.

It may be appreciated that, the rotation shaft is arranged on the side wall of the feeding channel, and the rotation hole is arranged in the side wall of the overturn storage container.

It may be appreciated that, the rotation shaft is arranged separately, the side wall of the feeding channel is provided with a rotation hole, and the side wall of the overturn storage container is provided with a rotation hole, and the rotation shaft passes through the two rotation holes, to articulate the overturn storage container to the side wall of the feeding channel.

It may be appreciated that, the feeding channel can be vertically arranged on the crushing chamber body, that is, the feeding channel is arranged to be perpendicular to the crushing chamber body; or, the feeding channel may also be obliquely arranged on the crushing chamber body, that is, an inclination angle is presented between the feeding channel and the crushing chamber body.

Second Embodiment

Figure 5:
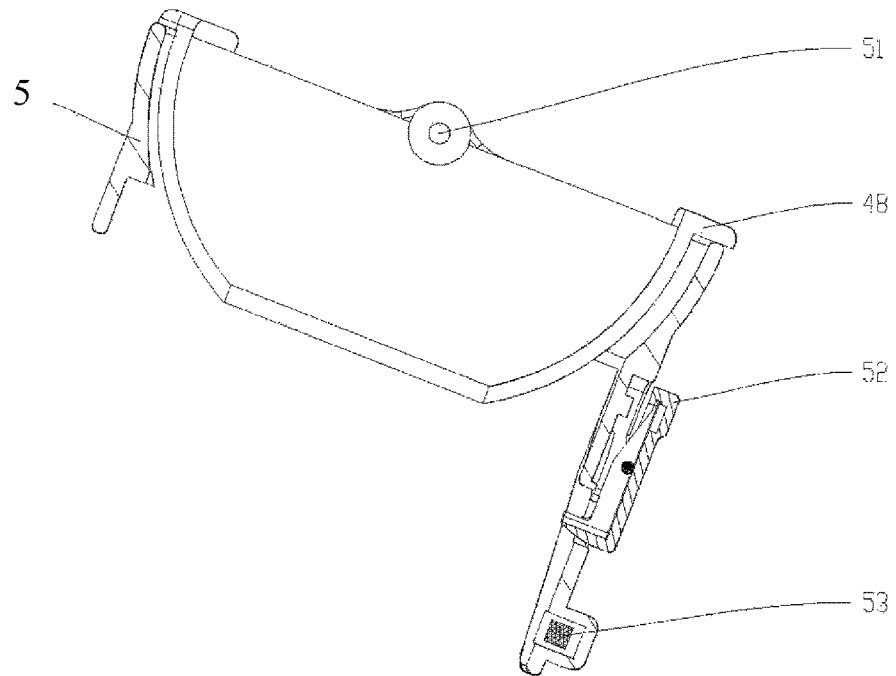
FIG. 5 is a sectional view of a mounting seat in a second embodiment of the juicer according to the present application.
Figure 6:
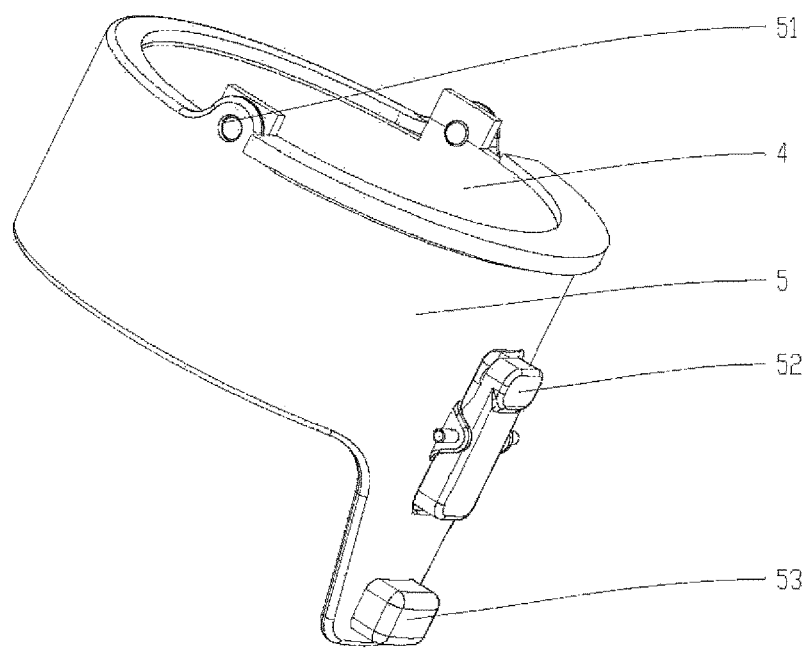
FIG. 6 is a schematic perspective view showing the structure of the mounting seat in the second embodiment of the juicer according to the present application.

Unlike the first embodiment, in this embodiment, as shown in FIGS. 5 and 6, the overturn storage container 4 is inserted in the upper end of the feeding channel 24 via a mounting seat 5 and is located at the upper opening 241. The mounting seat 5 is annular. A side wall of the mounting seat 5 is provided with a rotation hole 51, the side wall of the overturn storage container 4 is provided with a rotation shaft 42, and the overturn storage container 4 is articulated to the mounting seat 5 by the cooperation between the rotation shaft 42 and the rotation hole 51.

The mounting seat 5 is provided with a push button type buckle 52, and the side wall of the feeding channel 24 is provided with a protrusion configured to cooperate with the push button type buckle 52. A magnetic control switch is arranged inside the base 1 at a position corresponding to the mounting seat 5, and the mounting seat 5 is correspondingly provided with a magnet 53 configured to trigger the magnetic control switch. The mounting seat 5 is provided with a mounting groove, and the magnet 53 is mounted inside the mounting groove. Such arrangement has the following advantages. With the push button type buckle, the overturn storage container is detachable, thus the operation is convenient, and the user experience is improved. Moreover, if the user detaches the overturn storage container in the normal working process of the machine, the magnetic control switch is disconnected, and the machine stops working, to prevent the user from operating in a state that the overturn storage container has been detached and inadvertently extending a finger into the crushing chamber and further touching the squeezing screw rod, thus avoiding an occurrence of mechanical hazards and ensuring operational safety and reliability. This embodiment has the following advantages. The overturn storage container is inserted in the feeding channel via the mounting seat, which enables the overturn storage container to be detachable, and facilitates cleaning and using. Moreover, the mounting seat is provided with the rotation hole, the overturn storage container is provided with the rotation shaft, and the overturn storage container is articulated to the mounting seat by the cooperation between the rotation shaft and the rotation hole, thus the structure is simple and is easy to implement. Furthermore, with the push button type buckle, it is convenient to detach the overturn storage container; and by arranging the magnet and the magnetic control switch, it can prevent the user from operating in the state that the overturn storage container has been detached and inadvertently extending a finger into the crushing chamber and further touching the squeezing screw rod, thus avoiding an occurrence of mechanical hazards and ensuring operational safety and reliability. Other structures and beneficial effects of this embodiment which are not described are identical to those of the first embodiment, thus will not be described here.

Third Embodiment

Figure 7:
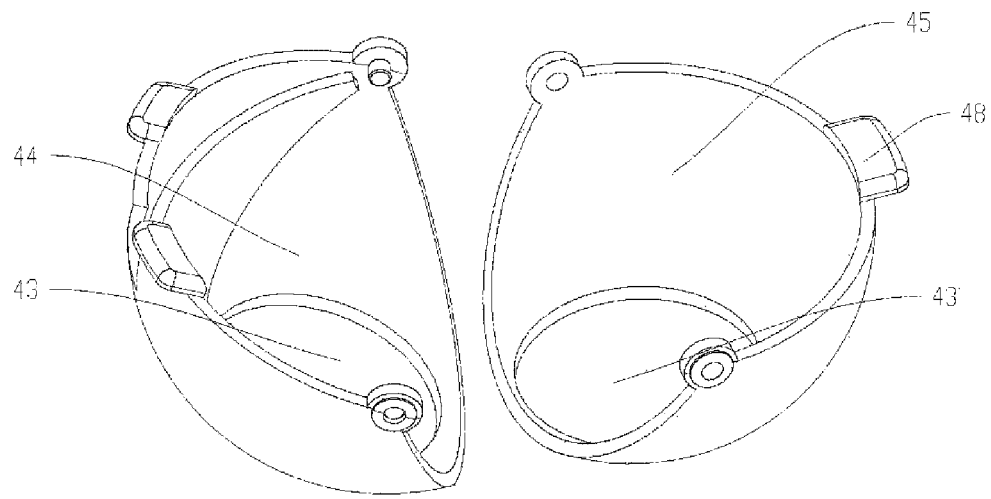
FIG. 7 is a schematic exploded view showing the structure of an overturn storage container in a third embodiment of the juicer according to the present application.

Unlike the first embodiment, in this embodiment, as shown in FIG. 7, the overturn storage container 4 includes a first storage container 44 and a second storage container 45. The first storage container 44 and the second storage container 45 cooperate with each other to form a material receiving chamber 41. The first storage container 44 and the second storage container 45 can be separated from each other to allow the material in the material receiving chamber 41 to fall into the feeding channel 24. The first storage container 44 and the second storage container 45 both include a side wall and a bottom wall. Upper ends of side walls of the first storage container 44 and the second storage container 45 are provided with rotation holes in communication with each other, and the side wall of the feeding channel 24 is provided with a rotation shaft, the rotation shaft passes through the rotation holes in the side walls of the first storage container 44 and the second storage container 45, to allow the first storage container 44 and the second storage container 45 to rotate respectively about the rotation shaft. The bottom walls of the first storage container 44 and the second storage container 45 are overlapped, and the auxiliary feeding opening 43 passes through the bottom walls of the first storage container 44 and the second storage container 45.

The working manner of the overturn storage container is described as follows. First, a user places a material in the material receiving chamber 41, and grasps operating portions 48 of the first storage container 44 and the second storage container 45 by two hands respectively and rotate the operating portions 48 upwards, thus the first storage container 44 and the second storage container 45 are separated from each other, and the material receiving chamber 41 is opened to form an opening, and the material falls into the feeding channel 24 from the opening. When it is required to feed the material again, the user releases his hands, and the first storage container 44 and the second storage container 45 are again overlapped to form the material receiving chamber 41, and then the user places the material in the material receiving chamber 41, and the above operations are repeated. It may be appreciated that, the rotation shaft is arranged on the upper end of the side wall of one of the first storage container and the second storage container, to pass through the rotation hole arranged in the side wall of the feeding channel and the rotation hole arranged in the upper end of the side wall of the other one of the first storage container and the second storage container.

It may be appreciated that, the rotation shaft is arranged separately, the upper end of the side wall of the first storage container, the upper end of the side wall of the second storage container, and the side wall of the feeding channel are each provided with a rotation hole, and the rotation shaft passes through the rotation holes, to enable the first storage container and the second storage container to rotate about the rotation shaft.

It may be appreciated that, the first storage container and the second storage container are mounted at the upper opening of the feeding channel by the mounting seat.

Fourth Embodiment

Figure 8:
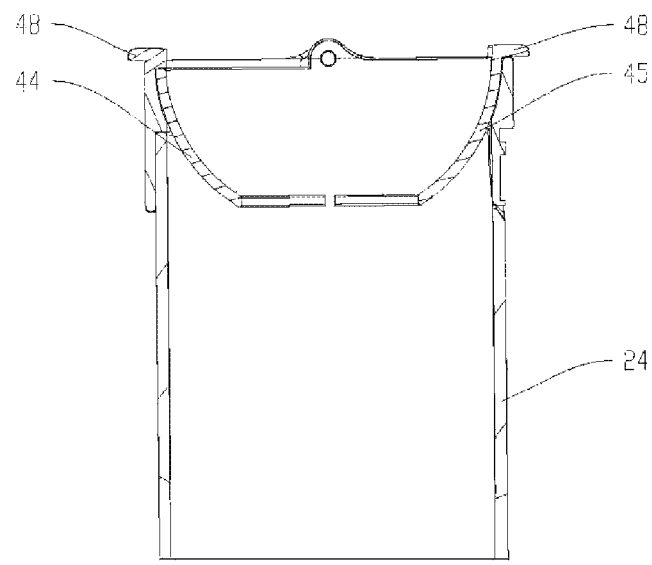
FIG. 8 is a schematic view showing the structure of an overturn storage container in a fourth embodiment of the juicer according to the present application.

Unlike the first embodiment, in this embodiment, as shown in FIG. 8, the overturn storage container 4 includes a first storage container 44 and a second storage container 45. The first storage container 44 and the second storage container 45 cooperate with each other to form a material receiving chamber 41. The first storage container 44 and the second storage container 45 can be separated from each other to allow the material in the material receiving chamber 41 to fall into the feeding channel 24. The first storage container 44 and the second storage container 45 are formed by partitioning the overturn storage container 4 from the center, and the first storage container 44 and the second storage container 45 are symmetrically arranged. Upper ends of the first storage container 44 and the second storage container 45 are each provided with a rotation hole, and the side wall of the feeding channel 24 is provided with a rotation shaft, the rotation shaft passes through the rotation holes in the upper ends of the first storage container 44 and the second storage container 45, to enable the first storage container 44 and the second storage container 45 to rotate respectively about the rotation shaft.

This embodiment has the following advantages, A rotation angle of the overturn storage container is reduced, that is, even the overturn storage container is rotated by a small angle, the material can enter the feeding passage, thus facilitating the user's operation and improving the user experience. Other structures and beneficial effects of this embodiment which are not described are identical to those of the first embodiment, thus will not be described here.

It may be appreciated that, the rotation shaft is arranged on the upper end of one of the first storage container and the second storage container, and is configured to pass through the rotation hole arranged in the side wall of the feeding channel and the rotation hole arranged in the upper end of the other one of the first storage container and the second storage container.

It may be appreciated that, the rotation shaft is arranged separately. The upper end of the first storage container, the upper end of the second storage container and the side wall of the feeding channel are each provided with a rotation hole, and the rotation shaft passes through the rotation holes, to enable the first storage container and the second storage container to rotate about the rotation shaft.

It may be appreciated that, the first storage container and the second storage container are mounted at the upper opening of the feeding channel by the mounting seat.

Fifth Embodiment

Figure 9:
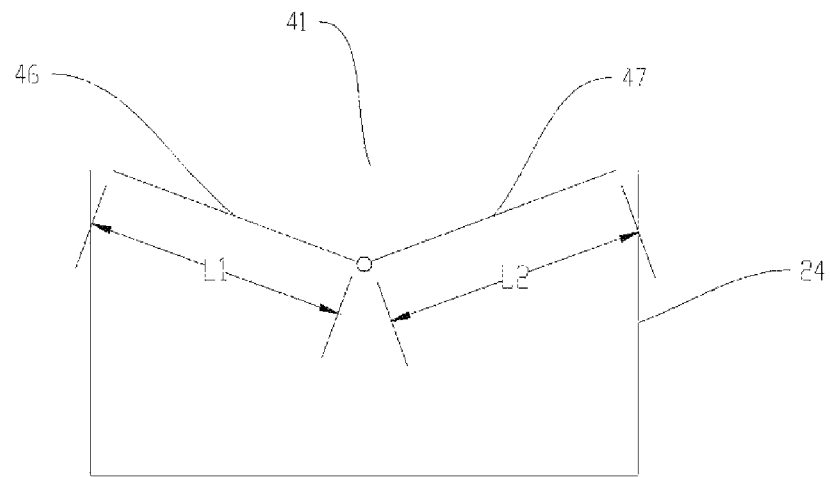
FIG. 9 is a schematic view showing the structure of an overturn storage container in a fifth embodiment of the juicer according to the present application.

Unlike the first embodiment, in this embodiment, as shown in FIG. 9, the overturn storage container 4 includes a first material holding plate 46 and a second material holding plate 47. The first material holding plate 46 and the second material holding plate 47 are each in the shape of a flat plate. The first material holding plate 46 has a length of L1, L1<R, and the second material holding plate 47 has a length of L2, L2<R, and L1=L2. The first material holding plate 46 and the second material holding plate 47 are flat plates and are each integrally formed by injection molding, and the first material holding plate 46 and the second material holding plate 47 are arranged to intersect with each other to form the material receiving chamber 41.

The first material holding plate 46 and the second material holding plate 47 intersect with each other to define a V shape, and the material receiving chamber 41 has a V-shaped longitudinal section. The rotation center of the overturn storage container 4 is arranged at the intersecting portion of the first material holding plate 46 and the second material holding plate 47, that is, a rotation shaft or a rotation hole is provided at the intersecting portion of the first material holding plate 46 and the second material holding plate 47, and is configured to cooperate with a rotation hole or a rotation shaft arranged in the side wall of the feeding channel 24, to enable the first material holding plate 46 and the second material holding plate 47 to rotate about the rotation shaft or the rotation hole.

It may be appreciated that, the first material holding plate and the second material holding plate are each in the shape of a curved plate.

It may be appreciated that, the lengths of the first material holding plate and the second material holding plate are different, that is, L1 is less than or greater than L2.

It may be appreciated that, the rotation shaft is arranged separately. A rotation hole is provided in the intersecting portion of the first material holding plate and the second material holding plate, and the rotation shaft passes through the rotation hole, to enable the first material holding plate and the second material holding plate to rotate about the rotation shaft.

It may be appreciated that, two first material holding plates and two second material holding plates are provided, such that the overturn storage container is in the shape of a diagonal cruciform, that is, the overturn storage container has four material receiving chambers each having a V-shaped longitudinal section.

Sixth Embodiment

Figure 10:
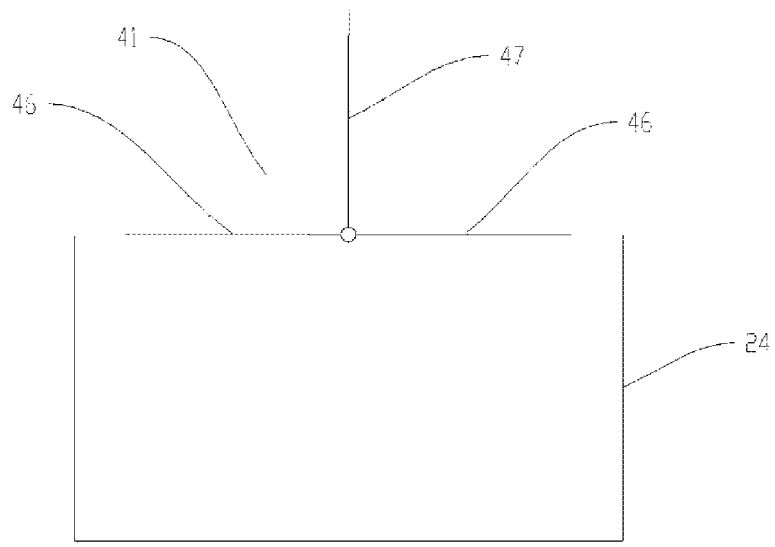
FIG. 10 is a schematic view showing the structure of an overturn storage container in a sixth embodiment of the juicer according to the present application.

Unlike the first embodiment, in this embodiment, as shown in FIG. 10, the overturn storage container 4 includes a first material holding plate 46 and a second material holding plate 47. The first material holding plate 46 and the second material holding plate 47 are each in the shape of a flat plate. The first material holding plate 46 has a length of L1, L1<R, and the second material holding plate 47 has a length of L2, L2<R, and L1=L2. The first material holding plate 46 and the second material holding plate 47 are flat plates and are each integrally formed by injection molding, and the first material holding plate 46 and the second material holding plate 47 are arranged to intersect with each other to form the material receiving chamber 41.

Two of the first material holding plates 46 are provided, and intersect with the second material holding plate 46 to define an inverted T shape, and the material receiving chamber 41 has an L-shaped longitudinal section, to allow the overturn storage container 4 to include two material receiving chambers 41 each having an L-shaped longitudinal section. The rotation center of the overturn storage container 4 is arranged at the intersecting portion of the first material holding plate 46 and the second material holding plate 47, that is, a rotation shaft or a rotation hole is provided at the intersecting portion of the first material holding plate 46 and the second material holding plate 47, and is configured to cooperate with a rotation hole or a rotation shaft arranged in the side wall of the feeding channel 24, to enable the first material holding plate 46 and the second material holding plate 47 to rotate about the rotation shaft or the rotation hole.

It may be appreciated that, the first material holding plate and the second material holding plate are each in the shape of a curved plate.

It may be appreciated that, the lengths of the first material holding plate and the second material holding plate are different, that is, L1 is less than or greater than L2.

It may be appreciated that, the rotation shaft is arranged separately. A rotation hole is provided at the intersecting portion of the first material holding plate and the second material holding plate, and the rotation shaft passes through the rotation hole, to enable the first material holding plate and the second material holding plate to rotate about the rotation shaft.

It may be appreciated that, two first material holding plates and two second material holding plates are provided, such that the overturn storage container is in the shape of a regular cruciform, that is, the overturn storage container includes four material receiving chambers each having an L-shaped longitudinal section.

Seventh Embodiment

Figure 11:
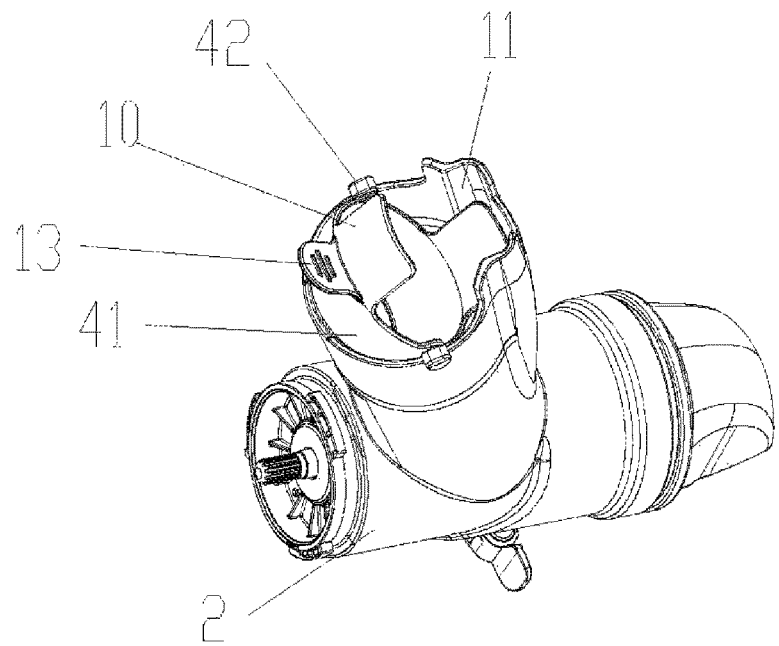
FIG. 11 is a schematic view showing the structure of a material receiving chamber in a seventh embodiment of the juicer according to the present application.
Figure 12:
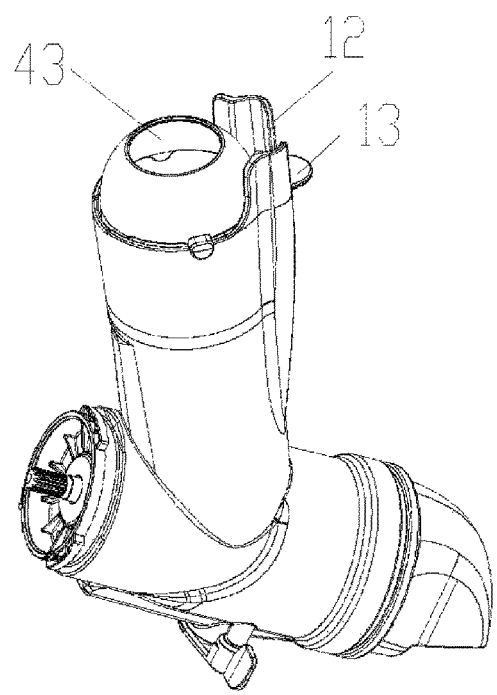
FIG. 12 is a schematic view showing the structure of a notch in the seventh embodiment of the juicer according to the present application.

As shown in FIGS. 11 and 12, the overturn storage container 4 is provided with a blocking portion, and the blocking portion is configured to block the human body when the overturn storage container 4 is overturned, to prevent the hand of the human body from extending into the feeding channel during the overturning process. Such arrangement has the following advantages, by providing the blocking portion, during the overturning process, the overturn storage container 4 can always block the human body no matter which overturning angle the overturn storage container 4 is located at, to prevent the hand of the human body from extending into the feeding channel and further contacting the screw rod and being injured accordingly, and avoid a safety loophole of the overturn storage container 4 caused by the overturning angle, thereby achieving comprehensive safety protection to the human body and allowing users to use the machine trustingly.

The overturn storage container 4 includes a material receiving chamber 41 and a rotation shaft 42, two rotation shafts 42 are provided and are arranged symmetrically. The rotation center of the overturn storage container 4 is the axes of the rotation shafts 42. The material receiving chamber 41 refers to a concrete object having a material receiving space rather than a spatial concept. The rotation shafts 42 are located on a side wall of the material receiving chamber 41, and the material receiving chamber 41 is in the shape of a bowl. The material receiving chamber 41 in this embodiment is in the shape of a hemisphere, and of course, the cross section of the material receiving chamber 41 may also be configured as circular or elliptical according to the design requirements. In this embodiment, the feeding channel is a circular tube, and a side wall of the feeding channel is provided with rotation holes 243, the material receiving chamber 41 is articulated to the side wall of the feeding channel by the cooperation between the rotation shafts 42 and the rotation holes 243, and the material receiving chamber 41 can rotate by at least 90 degrees about the rotation shafts 42. The blocking portion is arranged at an edge of the material receiving chamber 41, and is integrally formed with the edge of the material receiving chamber 41. Such arrangement has the following advantages, the blocking portion is arranged at the edge of the material receiving chamber 41, thus the blocking portion only blocks the human body during the overturning process and does not interfere with the feeding of materials, thereby ensuring the safety of the human body and preventing the hand from being stuck without interfering with the feeding of the materials into the feeding channel, to allow the materials to participate the squeezing and juicing processes, and in addition, the overturning process can be performed smoothly, and the material can be fed smoothly without any hindrance.

Figure 13:
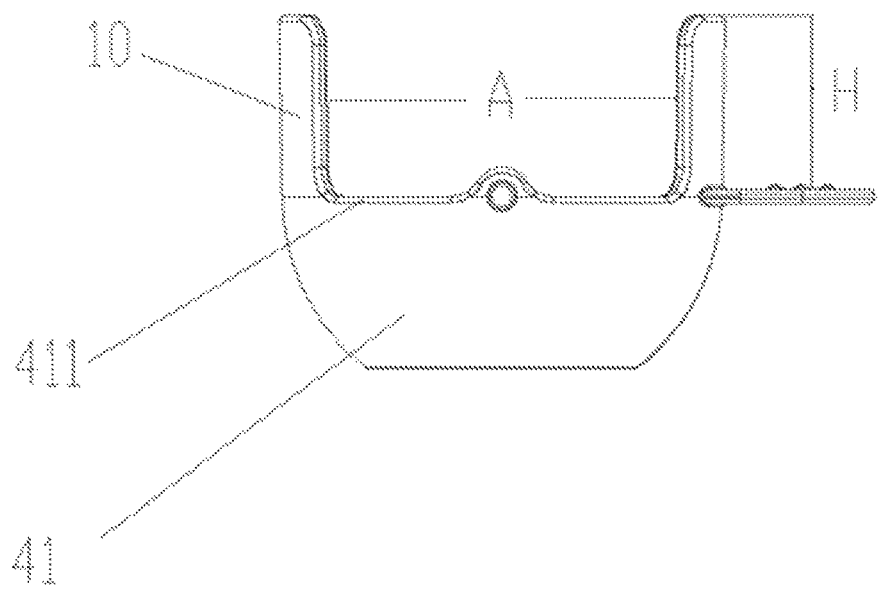
FIG. 13 is a schematic view showing the structure of a baffle in the seventh embodiment of the juicer according to the present application.
Figure 14:
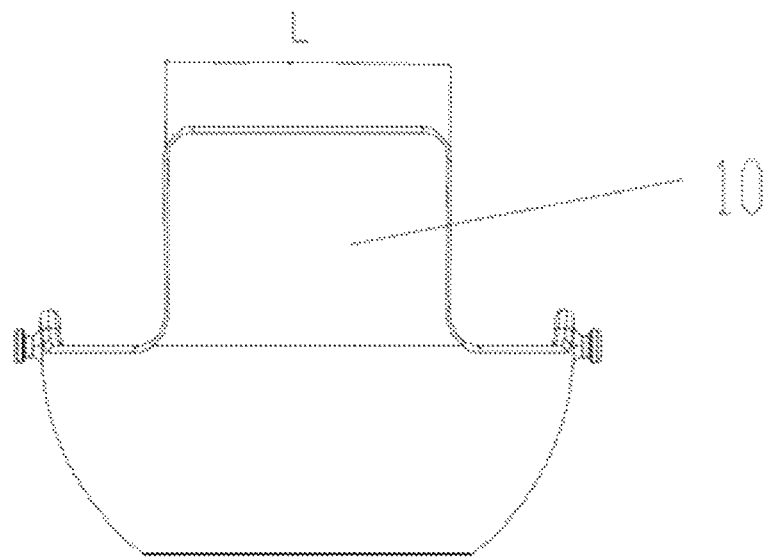
FIG. 14 is a side view of the baffle in the seventh embodiment of the juicer according to the present application.

As shown in FIG. 13, the material receiving chamber 41 includes an opening 411 at an upper end. The blocking portion is a baffle 10 formed by an edge of the opening extending upward. The edge of the opening extending upward here may be embodied as the whole edge extending upward or a part of the edge extending upward, and in this embodiment, an edge, at a side opposite to the rotation shafts 42, of the bowl-shaped material receiving chamber 41 extends upward. For facilitating the molding, the baffle 10 has a thickness same as the thickness of the edge of the opening of the material receiving chamber 41. The baffle 10 in this embodiment is in the shape of a square sheet, and is configured to have rounded corners. The baffle 10 has a height of H, and the height means a height of the upwardly extending portion of the edge, where $15 \text{ mm} \leq H \leq 45 \text{ mm}$. In this embodiment, H is 30 mm. As shown in FIG. 14, the baffle 10 has a width of L, where $20 \text{ mm} \leq L \leq 45 \text{ mm}$. If L is greater than 45 mm, the material feeding will be interfered; and if L is less than 20 mm, an effective blocking effect cannot be achieved, thus, in this embodiment, L is 30 mm. Such parameter configuration ensures that there is no risk of the hand of the human body entering the feeding channel when the overturn storage container is overturned to a certain angle, and has a good safety effect.

In this embodiment, the baffle 10 is formed by the edge extending upward vertically, the material receiving chamber 41 includes the opening 411 at the upper end, and the opening 411 and the baffle 10 are perpendicular to each other to have an angle of 90 degrees therebetween.

Two baffles 10 are provided, and are symmetrically arranged at two opposite sides with reference to the rotation center of the overturn storage container 4. The two baffles 10 have the same height and the same width, and are spaced from each other by a distance A, where 45 mm≤A≤90 mm. In this embodiment, A is 81 mm, if A is less than 45 mm, large materials cannot be received, and it is difficult for the material to be directly fed in; and if A is greater than 90 mm, safety risk may be increased, and there is a risk of the hand of the human body extending into the feeding channel during the overturning process. Such arrangement has the following advantages, by providing the two baffles 10 and defining the distance therebetween, the material receiving chamber 41 can basically receive an ordinarily sized apple, thus enabling a whole fruit to enter the feeding channel to participate in the squeezing process without cutting the fruit, and moreover, the two baffles 10 have a further position-limiting effect to the material, which can prevent the material from falling out from the material receiving chamber 41 due to a too large overturning force during the overturning process.

One side of the upper opening of the feeding channel extends outwards to form an extension chamber 11, that is, a part of the side wall of the feeding channel extends outwards, to cause the cross section of the feeding channel to form an asymmetric plane. The baffle 10 is accommodated in the extension chamber 11 during the overturning process, and does not interfere with an inner wall of the extension chamber 11, and is spaced from the inner wall of the extension chamber 11 by a gap, the shortest distance of the gap ranges from 2 mm to 10 mm, inclusive. If the gap is less than 2 mm, material is apt to be stuck, and it is easy to cause interference; and if the gap is greater than 10 mm, there will be a risk of a finger extending into the gap. The gap according to this embodiment is 3 mm. That is, the baffle 10 gradually extends into the extension chamber 11 during the overturning process, and does not have a surface contact with the extension chamber 11. Such arrangement has the following advantages, by providing the extension chamber 11, the overturning range of the material receiving chamber 41 is enlarged, and in this way, when the baffle 10 will not interfere with the upper opening of the feeding channel during the overturning process, thus the material receiving chamber 41 can continue to overturn, to allow the whole material receiving chamber 41 to be overturned by nearly 180 degrees. Therefore, it can avoid the issue that materials may be stuck between the feeding channel and the material receiving chamber 41, and achieve a thorough overturning of the materials, avoid the occurrence of materials being stuck, and enable the material feeding process to be more thorough.

An upper end of the extension chamber 11 is provided with a notch 12. The notch 12 is located at a center of the extension chamber 11, and is approximately flush with the material receiving chamber 41. An edge of the material receiving chamber 41 is provided with a handle 13, and the handle 13 is also formed by the edge of the material receiving chamber 41 extending outwards, and the handle 13 and the baffle 10 are located on the same side of the material receiving chamber 41. The handle 13 and the opening 411 are located in the same plane, and the handle 13 is accommodated in the notch 12 during the overturning process, that is, the handle 13 passes through the notch 12 during the overturning process, and is rested on the bottom of the notch 12. Such arrangement has the following advantages, by providing the handle 13, the overturning of the material receiving chamber 41 can be performed more conveniently and effortless. Since the provision of the handle 13 and the baffle 10 may limit the overturning range which may further cause the overturning process to be not thorough, the cooperation between the notch 12 and the handle 13 enables the handle 13 to be not limited during the overturning process, and thus, the overturning range may approach 180 degrees, and the material will not be blocked when entering the feeding channel.

Eighth Embodiment

Figure 15:
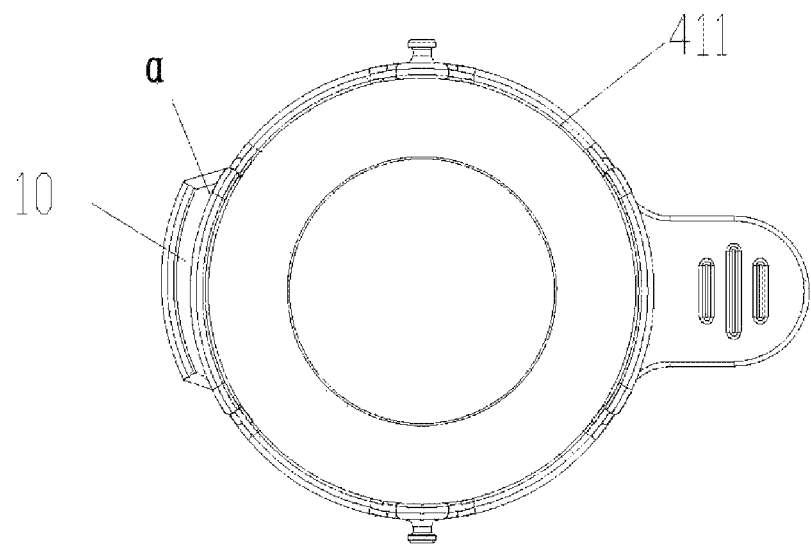
FIG. 15 is a schematic view showing the structure of a baffle in an eighth embodiment of the juicer according to the present application.

As shown in FIG. 15, unlike the seventh embodiment, in this embodiment, the baffle 10 extends outwards, to form an inclination angle with respect to the opening 411, and the inclination angle α>90 degrees. In this embodiment, α is 120 degrees. Such arrangement has the following advantages, with the baffle 10 extending outwards, the material will not be blocked by the baffle 10, such that, the material may not be limited by the baffle 10 when being fed before the overturning process, and the material can be placed into the material receiving chamber 41 easily, and will have a tendency of sliding into the material receiving chamber 41 along the baffle 10, thus, the material can be more conveniently placed, and may not be blocked in the overturning process. In addition, expanding outwards of the baffle 10 also enables the baffle 10 to function as the handle 13, thus facilitating a user's holding and overturning the material receiving chamber 41, therefore, there is no need to separately provide the handle 13, and the function of the handle 13 can still be realized.

Ninth Embodiment

Figure 16:
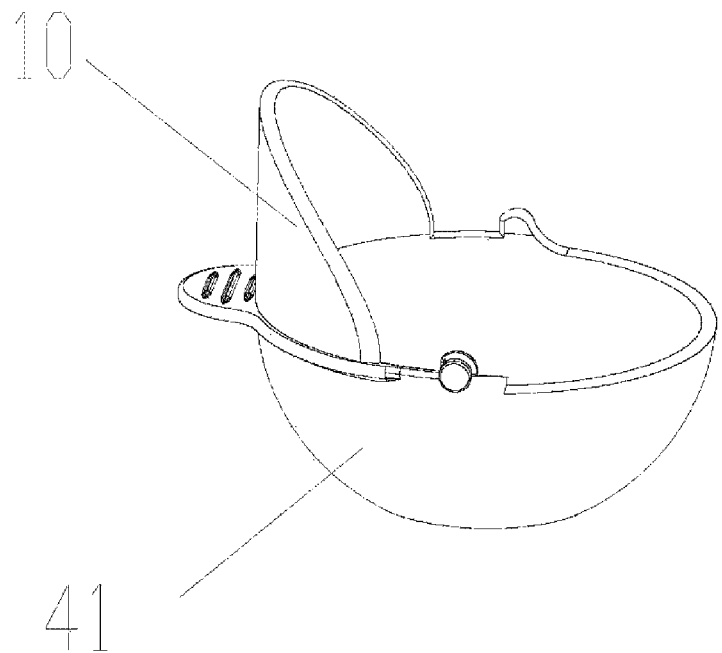
FIG. 16 is a schematic view showing the structure of a baffle in a ninth embodiment of the juicer according to the present application.

As shown in FIG. 16, unlike the seventh embodiment, in this embodiment, the baffle 10 is arc-shaped, that is, the baffle 10 extends gradually upwards from the edge of the opening of the bowl-shaped material feeding chamber 41, and the height of the baffle 10 is gradually reduced from the middle to two ends, and is smoothly connected to the edge of the opening of the material receiving chamber 41. The height value of the highest point of the baffle 10 is in the range of the height H in the first embodiment. After being overturned, the baffle 10 is rested on the edge of the upper opening of the feeding channel. The ratio of the upward extending edge to the whole edge of the opening of the material receiving chamber ranges from 1/4 to 1/2, inclusive. The ratio reaching 1/2 means that a half of the whole edge extends upward. The ratio in this embodiment is 1/3. Such arrangement has the following advantages, by configuring the baffle 10 to have a gradually changed height, it may facilitate the integral forming of the baffle 10, and avoid cleaning dead corners between the baffle 10 and the material receiving chamber 41, thereby not only improving the aesthetic, but also facilitating the cleaning.

Tenth Embodiment

Figure 17:
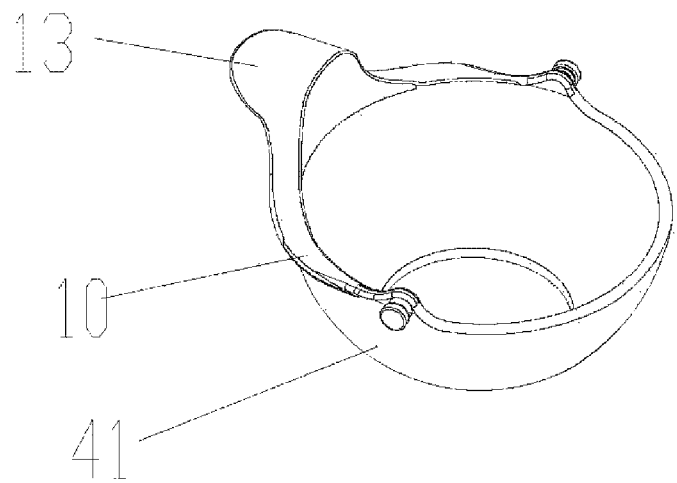
FIG. 17 is a schematic view showing the structure of a baffle in a tenth embodiment of the juicer according to the present application.

As shown in FIG. 17, unlike the seventh embodiment, in this embodiment, the baffle is formed by a portion of the edge of the opening extending upwards first and then being flanged outwards. The portion of the edge in this embodiment is a half of the edge of the opening of the bowl-shaped material receiving chamber, and the portion of the edge extends upward along the circular arc-shaped edge, that is, extending to the rotation shaft 42, and then the outwardly flanged portion forms the handle 13, and the outwardly flanged portion has a length ranging from 10 mm to 40 mm, inclusive. If the length is less than 10 mm, the flanged portion will be inconvenient for holding, which makes no sense to provide the flanged portion; if the length is greater than 40 mm, the flanged portion will limit the overturning angle of the material during the overturning process, which causes that the material can not be overturned thoroughly. The length of the outwardly flanged portion is 20 mm in this embodiment, which not only is esthetic, but also is convenient to use. Such arrangement facilitates a user's holding and using the baffle, and does not interfere with the feeding of the materials.

Eleventh Embodiment

Figure 18:
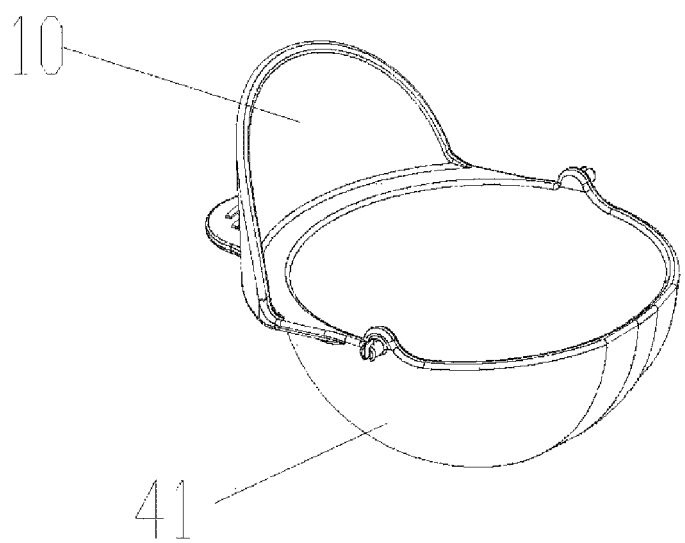
FIG. 18 is a schematic view showing the structure of a baffle in an eleventh embodiment of the juicer according to the present application.

As shown in FIG. 18, unlike the first embodiment, in this embodiment, the baffle is formed by the edge of the opening extending outwards first and then extending upwards, to thereby allowing the baffle 10 to have an L-shaped longitudinal section. The length of the extending outwards portion is same as the wall thickness of the upper opening of the feeding channel. In this embodiment, the baffle may extends outwards at the same time while extending upwards, and an inclination angle formed by the enlarged baffle with respect to the plane where the opening is located ranges from 90 degrees to 150 degrees, inclusive. In this way, it is convenient to feed materials, and also convenient for the user to hold the baffle. After being overturned, the baffle 10 is rested on the edge of the upper opening of the feeding channel. Such arrangement has the following advantages, the provision of the L-shaped baffle 10 enlarges the accommodating space above the opening 411 of the material receiving camber 41, and fruits having large widths or irregular shapes can be conveniently placed into the material receiving chamber 41 without being stuck at the opening 411, thus enlarging the supporting width of the material receiving chamber 41, and preserving a space for the hand of the user when holding a material pushing rod. In addition, the length of the outwardly extended portion is set to enable the outwardly extended portion, after being overturned, to be exactly matched with the upper opening of the feeding channel, thereby allowing the material receiving chamber 41 to rotate by 180 degrees without any position-limiting dead corners, and allowing the overturning process to be more thorough.

Twelfth Embodiment

Unlike the first to twelfth embodiments, the juicer in this embodiment is a vertical juicer, and the juicer includes a base having a motor, a crushing chamber mounted at an upper side of the base, and a screw rod vertically arranged in the crushing chamber. The crushing chamber includes a crushing chamber body and an upper cover configured to cover an upper end of the crushing chamber body. A feeding channel is provided above the upper cover, and the feeding channel can be vertically arranged above the upper cover, or obliquely arranged above the upper cover, and may also be arranged above the upper cover in a spirally extending manner.

It may be appreciated that, in the vertical juicer, the feeding channel may also be obliquely arranged on the side wall of the crushing chamber. Other structures of the vertical juicer are conventional structures in this field, which will not be described here one by one.

The above embodiments are only preferred embodiments of the present application, and are not intended to limit the scope of implementation of the present application. All equivalent variations and modifications made based on the present application are covered by the scope of claims of the present application, and will not be listed here in detail.

What is claimed is:

1. A screw-rod squeeze juicer, comprising:
   a base having a motor,
   a crushing chamber mounted on the base, and
   a screw rod arranged inside the crushing chamber,
   wherein the crushing chamber comprises a crushing chamber body, the crushing chamber body has a juice outlet and a residue outlet, the crushing chamber has a feeding opening and a feeding channel connected to the feeding opening, the feeding channel comprises an upper opening and a lower opening connected to the feeding opening; and
   wherein a rotatable overturn storage container is movably provided at the upper opening, a rotation center line of the overturn storage container traverses the upper opening, the overturn storage container has a material receiving chamber for accommodating a material, and the material receiving chamber is in the shape of a bowl, and the overturn storage container is rotatable about the rotation center line in any direction; and
   wherein the overturn storage container is configured to rotate by at least 60 degrees, to allow the material to enter the feeding channel, and the rotation center line of the overturn storage container passes through a center of the upper opening.

2. The juicer according to claim 1, wherein the upper opening has an effective diameter of D1, the overturn storage container has a rotation radius of R, and R<D1/2; the overturn storage container has a material receiving chamber.

3. The juicer according to claim 2, wherein the material receiving chamber is in the shape of a bowl, the material receiving chamber has a depth of H, and H<R, and the material receiving chamber has an overturning angle ranging from 90 degrees to 180 degrees, inclusive.

4. The juicer according to claim 2, wherein the overturn storage container comprises a first storage container and a second storage container, the first storage container and the second storage container cooperate with each other to form the material receiving chamber, and the first storage container and the second storage container are configured to be separated from each other to allow the material in the material receiving chamber to fall into the feeding channel; or,
   the overturn storage container comprises a first material holding plate and a second material holding plate, the first material holding plate and the second material holding plate are arranged to intersect with each other to form the material receiving chamber, the first material holding plate has a length of L1, and L1<R, the second material holding plate has a length of L2, and L2<R, and the material receiving chamber has an L-shaped or V-shaped longitudinal section.

5. The juicer according to claim 1, wherein a bottom of the overturn storage container has an auxiliary feeding opening, and the auxiliary feeding opening has an equivalent inner diameter of D2, and D2<45 mm.

6. The juicer according to claim 1, wherein the overturn storage container is provided with a blocking portion.

7. The juicer according to claim 6, wherein the overturn storage container comprises a material receiving chamber and the blocking portion is arranged on an edge of the material receiving chamber.

8. The juicer according to claim 7, wherein the material receiving chamber comprises an opening located at an upper end, and the blocking portion is a baffle formed by an edge of the opening extending upwards.

9. The juicer according to claim 8, wherein the baffle extends outwards and forms an inclination angle with respect to the opening, and the inclination angle $\alpha > 90$ degrees;
- or, two baffles are provided and are symmetrically arranged at opposite two sides with respect to the rotation center of the overturn storage container, the two baffles are spaced from each other by a distance of A, and 45 mm $\leq$ A $\leq$ 90 mm;
- or, one side of the upper opening of the feeding channel extends outwards to form an extension chamber, and the baffle is accommodated inside the extension chamber while being overturned;
- or, a height of the baffle is gradually reduced from the middle to two ends, and the baffle is rested on the edge of the upper opening of the feeding channel after being overturned;
- or, the baffle is formed by the edge of the opening extending upwards first and then being fanged outwards;
- or, the baffle is formed by the edge of the opening extending outwards first and then extending upwards.

\* \* \* \* \*